Aug. 30, 1932. W. H. KETCHLEDGE ET AL 1,874,758
WINDSHIELD WIPER
Filed March 3, 1931
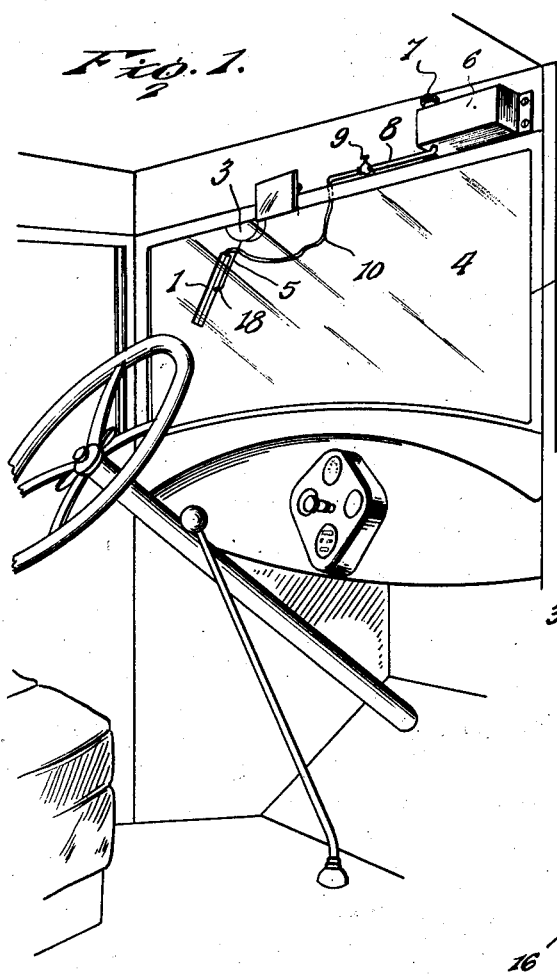
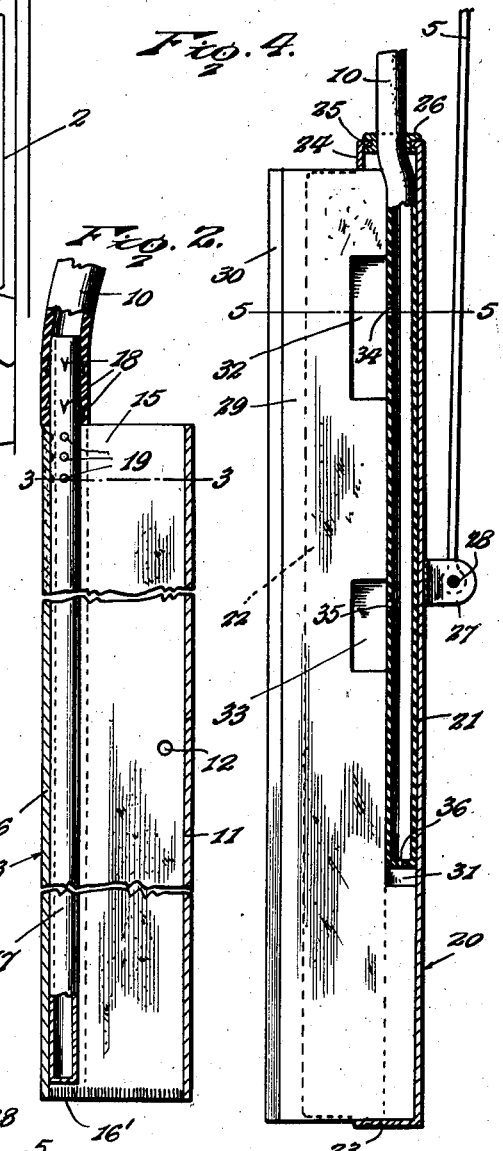
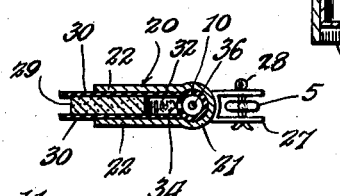
W. H. Ketchledge.
N. R. Wright.
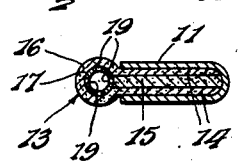

Patented Aug. 30, 1932

1,874,758

UNITED STATES PATENT OFFICE

WILLIAM H. KETCHLEDGE AND NORMAN R. WRIGHT, OF EASTON, PENNSYLVANIA

WINDSHIELD WIPER

Application filed March 3, 1931. Serial No. 519,843.

This invention relates to automobile accessories and more particularly to a windshield wiper of the type adapted to be movably mounted in front of the windshield and clean the portion of the windshield glass in front of the driver's seat.

One object of the invention is to provide a wiper which will serve not only to remove dirt and rain from the windshield glass but also apply an anti-freezing solution to the glass and thereby permit the glass to be kept free from ice and snow during cold weather.

Another object of the invention is to so form the wiper that the anti-freezing solution may be fed thereto from a container mounted above the windshield and further to permit this fluid to be evenly distributed as it flows from a discharge tube or nozzle to the wiper and thereby cause the fluid to be properly applied to the glass of the windshield and snow and ice very effectively removed.

Another object of the invention is to so construct the device that it may be very effectively used both as a cleaner for a windshield glass and as a distributer for an anti-freezing solution and in addition cause a strip of absorbent material forming part of the wiper to be saturated with the anti-freezing solution and thereby prevent the absorbent strip from becoming frozen and unsuitable for use when it is saturated with water wiped from the windshield glass during cold weather.

The invention is illustrated in the accompanying drawing, wherein

Fig. 1 is a perspective view showing a windshield wiper of the improved construction applied to an automobile, Fig. 2 is a view showing the improved wiper partially in longitudinal section and partially in elevation, Fig. 3 is a transverse sectional view through the wiper taken on the line 3—3 of Fig. 2, Fig. 4 is a view similar to Fig. 2 showing a modified form of wiper, and Fig. 5 is a transverse sectional view taken on the line 5—5 of Fig. 4.

The improved wiper, which is indicated in general by the numeral 1, is to be mounted in front of the windshield 2 of an automobile and is provided with an operating mechanism 3 of a conventional construction whereby the wiper may be moved across the outer face of the glass 4 of the windshield and clean the portion of the glass in front of the driver's seat. The operating mechanism includes the usual rod 5 to which the wiper is attached, and in the present instance the wiper moves in an arcuate path. A container 6 having a filling neck 7 through which an anti-freezing solution may be poured into the container is secured against the inner face of the front of the automobile above the windshield and from the bottom of this container extends a pipe 8 provided with a control valve 9. The pipe extends transversely of the automobile and passes through the front wall thereof above the windshield. To the outer end of this pipe is attached a flexible tube or hose 10 formed of rubber or other suitable material and this tube is of such length that it has sufficient slackness to permit the wiper to move freely when in operation. It will thus be seen that the tube will not interfere with normal movement of the wiper and the wiper may move across the outer face of the windshield in its customary path of movement in order to remove dirt and rain water from the windshield. During warm weather the valve 9 is kept closed and, therefore, the wiper will merely act to clean the windshield glass of rain water and dirt but during cold weather the valve will be opened and a pad forming part of the wiper will become saturated with the anti-freezing solution. Therefore, when the pad moves across the windshield glass, the anti-freezing solution will be applied to the glass and this will cause snow and ice to be melted from the glass and easily wiped off. It will also cause the outer face of the glass to be coated with the anti-freezing solution and thereby prevent ice from again forming thereon.

The wiper itself may be constructed either as shown in Figures 2 and 3 or as shown in Figures 4 and 5. In the form shown in Figures 2 and 3, the wiper consists of a metal casing 11 which is U-shaped in cross section and preferably formed from a strip of sheet metal bent to assume the desired shape. This casing may be attached to the lower end of the rod 5 by a cotter pin engaged through opposed openings formed through side walls of the casing as shown at 12 or in any other desired manner. A strip of felt is folded upon itself, as shown in Figure 3, to form an absorbent wiping pad 13 having its side portions or leaves 14 engaged in the casing between the side walls thereof and between the side portions of the pad is disposed a strip 15 which is also preferably formed of felt. The united outer side edge portions of the leaves 14 form a pocket 16 extending longitudinally of the wiping pad and this pocket has its lower end closed by sewing the leaves of the strip together at their lower edges, as shown at 16'. A metal tube 17 extends longitudinally in the pocket and this tube has its lower end closed so that the tube will be filled with anti-freezing solution flowing from the hose 10. The metal tube projects upwardly from the pocket for engagement in the lower end of the tube 10 and is formed with spurs 18 to firmly hold it in engagement with the hose and its portion within the pocket 16 adjacent the upper end thereof is formed with side openings 19 through which the anti-freezing solution passes in order to saturate the wiping pad. As the anti-freezing solution passes outwardly through the openings 19, it will flow downwardly and the entire outer portion of the wiping pad will be saturated with the solution. The solution prevents the pad from freezing during cold weather and as the wiper moves across the windshield the solution will be applied to the outer face of the glass and snow and ice removed therefrom by the wiper.

In the form of wiper illustrated in Figures 4 and 5, there is provided a casing 20 formed of sheet metal and this casing has a tubular body portion 21 from which extend side walls 22. The lower end of the tubular body is closed, as shown at 23 and at its upper end the tubular body is extended above the side walls to form a neck 24 which is open at its upper end and formed with an inwardly extending annular flange 25 engaged in a groove formed about the margins of a thimble or nipple 26 serving to prevent danger of puncturing or cutting the rubber tube 10 which passes inwardly into the casing through this nipple. A clip 27 projects from the casing intermediate its ends and to this clip the lower end of the rod 5 is secured by a cotter key or equivalent fastener 28.

Within the casing is disposed a pad or strip 29 formed of felt or other suitable absorbent material and at opposite sides of this pad are disposed thin strips 30 of rubber. The pad and the rubber strips project outwardly from the casing, as shown clearly in Figure 5, and by referring to this figure, it will be seen that the rubber strips are of greater width than the absorbent strip and project beyond the outer side edge thereof. Therefore, when the wiper is in use, the rubber strips and the pad may have contact with the outer face of the windshield glass as the wiper is moved across the same and dirt and water will be removed from the glass in a very effective manner. The inner portion of the absorbent pad is cut from its upper end longitudinally thereof to form a recess or channel 31 terminating in spaced relation to the lower end of the pad and adapted to receive the portion of the rubber tube which extends into the casing. Pockets 32 and 33 lead from the channel 31 in spaced relation to each other longitudinally of the pad and openings 34 and 35 are formed in the tube so that the anti-freezing solution may flow from the tube into these pockets. The lower end of the tube is closed and formed with an opening 36 through which the anti-freezing solution may flow in order to saturate the lower portion of the pad. It should be noted that the opening 35 is smaller than the opening 34 and the opening 36 formed smaller than the opening 35. Therefore, when the anti-freezing solution flows through the tube 10 after the valve 9 has been opened, the solution will accumulate in the tube faster than it can flow through the openings 34, 35 and 36 and as it passes through these openings the pad will become saturated with the fluid. This fluid flows very slowly through the opening 36 at the lower end of the tube and larger quantities will flow through the openings 34 and 35 but the quantity flowing through the opening 35 will be less than that flowing through the opening 34. This is important as it is necessary to have all portions of the pad well saturated and it is also important that the fluid be evenly distributed. It will thus be seen that in either form anti-freezing solution may be applied to the outer face of a windshield glass as dirt and water are wiped from the glass and any snow or ice which may have adhered to the glass will be melted and wiped off.

Having thus described the invention, we claim:

1. In a windshield wiper, a casing having side walls and being open along one edge, a wiping pad of absorbent material mounted in said casing and projecting outwardly therefrom through the open edge thereof, the inner edge portion of the pad being cut to form a longitudinally extending seat terminating in spaced relation to the lower end of the pad and pockets leading into the pad from the seat in spaced relation to each other longitudinally of the pad, and a tube for delivering liquid to said pad from a source of supply extending through said seat longitudinally thereof and formed with a discharge opening at its inner end and with said openings communicating with said pockets.

2. In a windshield wiper, a casing having side walls and being open along one edge, a wiping pad of absorbent material mounted in said casing and projecting outwardly therefrom through the open edge thereof, the inner edge portion of the pad being cut to form a longitudinally extending seat terminating in spaced relation to the lower end of the pad and pockets leading from the seat towards the outer edge of the pad in spaced relation to each other longitudinally of the pad, and a tube for delivering liquid to said pad from a source of supply extending through said seat and formed with a discharge opening at its inner end to deliver liquid onto the lower portion of the pad and with side openings communicating with said pockets, the side openings decreasing in size towards the inner end of the tube and the opening at the inner end of the tube being smaller than the side openings.

3. In a windshield wiper, a casing having side walls and open along one edge, a wiping pad of absorbent material mounted in said casing and projecting outwardly therefrom through the open edge thereof, the inner portion of the pad being cut to form a longitudinal seat and spaced pockets communicating with the seat, and a liquid supply tube disposed within the seat and provided with perforations discharging into said pockets.

In testimony whereof we affix our signatures.

WILLIAM H. KETCHLEDGE. [L. S.]
NORMAN R. WRIGHT. [L. S.]